United States Patent Office 3,233,307
Patented Feb. 8, 1966

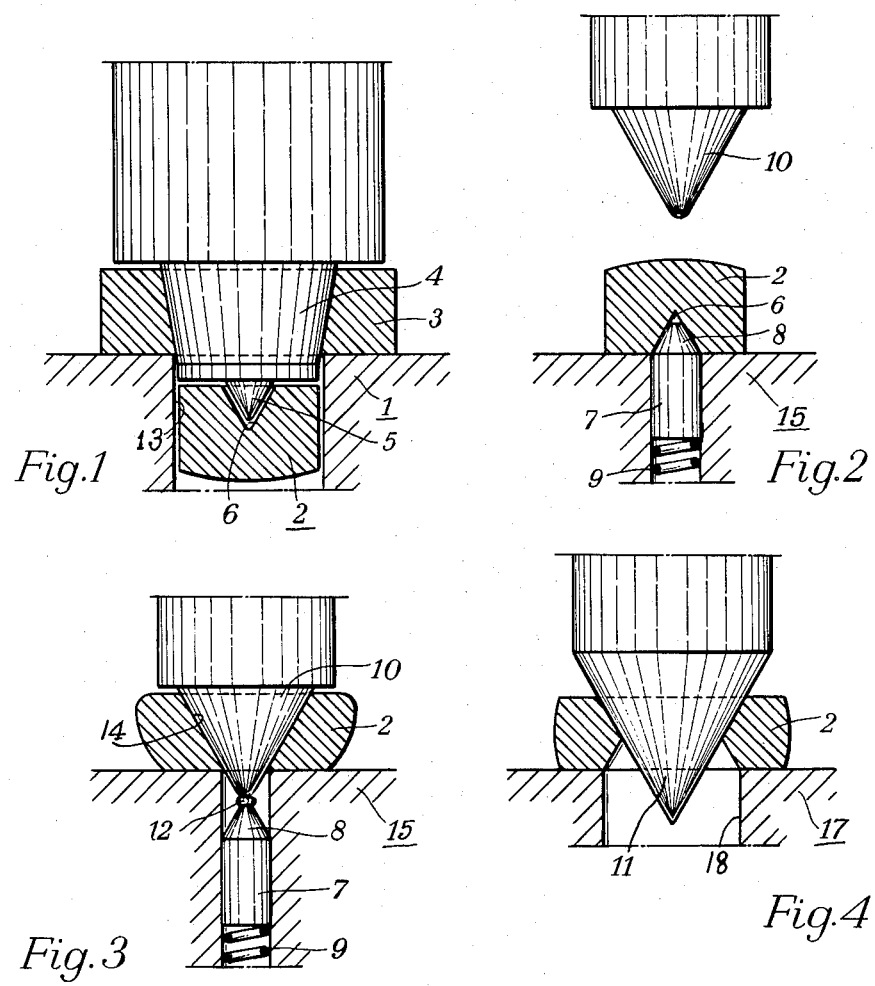

3,233,307
METHOD OF PRODUCING A PAIR OF RINGS FROM A SUBSTANTIALLY CIRCULAR BLANK
Gustaf Herman Kärrberg, Goteborg, and Karl Gustav Einar Derman, Savedalen, Sweden, assignors to Aktiebolaget Svenska Kullagerfabriken, Goteborg, Sweden, a corporation of Sweden
Filed Dec. 13, 1961, Ser. No. 159,115
2 Claims. (Cl. 29—148.4)

The present invention relates to a method of making a pair of rings from a substantially circular blank.

The method of the present invention is useful in making rings for various purposes but it is especially suitable in making race rings for rolling bearings. Heretofore, race rings have been made, for example, by turning them from tube material. However, this method has certain substantial drawbacks. For example, tube material is comparatively expensive to manufacture, and in order to minimize scrap losses resulting from the turning operation, a large number of tube sizes must be kept in stock, preferably one tube size for each size race ring.

In some instances bar stock is used instead of tube material. These bars are cut into blanks of a predetermined length so that their volume is the same or somewhat greater than that of the finished race ring. Each blank is then provided with a central opening in some suitable manner in order to make one ring from each blank. When casting the ingots from which the bars are rolled, slag inclusions collect in the center of the ingot. Since the position of the slag does not change during the rolling operation, a string of slag will be located along the center of the finished bars. Accordingly when the openings are made in the blanks cut from the bars, the slag will then be located around the wall of the opening and in the case of outer race rings made in this manner, the raceway surface which should have the best material will contain a quantity of slag inclusions. The quality of such an outer race ring will therefore be poor.

In accordance with the present invention a new and improved method for making race rings is provided which eliminates the drawbacks of prior methods set forth above. In accordance with the present invention, a pair of rings are made from a single, generally circular blank by removing a central disc portion from the blank concentric with the peripheral edge of the blank surface thereof leaving an outer annulus suitable as an outer race ring. Thereafter the central disc portion is pierced by means of a pointed conical punch which is impressed first into one and thereafter into the other of the substantially plane end faces of the central disc portion to a depth to pierce the material and provide an opening of a desired size whereby the material of the disc is displaced outwardly. The ring thus produced is suitable for use as an inner race ring. Accordingly it may be seen that there is a minimum of waste material and since the slag at the center of the blank is located at the inner surface of the inner race ring, the surface which engages the shaft upon which the ring is mounted, the raceways of both the inner race ring and the outer race ring are thus free of slag particles.

Other objects of the present invention and a more detailed description of the method of the present invention are hereinafter more fully set forth and described with reference to the accompanying drawing in which:

FIGS. 1 to 4 inclusive show successively the steps in the making of a pair of rings in accordance with the present invention.

Referring now to the drawing, there is shown in FIG. 1 a portion of an excenter press or the like including a portion of the table 1 having an opening 13 therein and a punch 4. A generally circular blank is adapted to be located on the table concentrically with the opening 13 therein. Thereafter as illustrated in FIG. 1, the punch 4 engages the blank to remove an inner central disc portion 2. The free end of the punch is provided with a conical pointed portion 5 which makes a conical impression 6 at the center of the disc portion 2 during the punching operation. The punch 4 is slightly tapered as shown to permit easy removal of the ring 3 therefrom. The ring 3 is then removed from the punch and then rolled in a ring rolling mill to provide for example an outer race ring.

Thereafter the disc portion 2 is turned over and placed on a table 15 having a conical pin projecting upwardly therefrom. The portion 2 is located so that the conical impression 6 fits onto the conical pin 7 as shown for example in FIG. 2. The pin 7 as illustrated can be moved downwards into the table 15 against the bias of a spring 9. A pointed conical punch 10 coaxial with the pin 7 is pressed into the end face of the disc portion 2 as shown in FIG. 3 until the disc is pierced and a centrally located opening 14 is formed. During this operation a small disc-like piece of scrap 12 is formed, the only scrap resulting from the operation. The opening 14 can be widened through continuing the operation as shown for example in FIG. 4 whereby the ring is turned with its opposite end faces alternately upwards and a larger punch 11 is pressed deeper and deeper relative to the table 17 having a suitable opening 18 therein. Thereafter the ring 2 if desired, may be further worked in a ring rolling mill or may be forged to size.

While the method of the present invention has been illustrated and described with reference to a particular type apparatus, it is, of course, to be understood that changes and modifications in various parts of the apparatus and in the manner and sequence of the method of making the rings in accordance with the present invention may be made within the scope of the present invention and the following claims.

We claim:
1. A method of making inner and outer race rings for a rolling bearing from a generally circular blank consisting of the steps of removing an inner central disc portion from the blank leaving an outer ring, impressing at least one face of the inner central disc portion with a centrally located impression, positioning the central disc portion on a guide member engaging in said central impression so that the opposite face may be engaged centrally with a pointed conical punch and thereafter piercing by means of the pointed conical punch one face and thereafter the other face of the disc portion to a depth to form an opening extending therethrough whereby the material of the disc is displaced outwardly, and finishing both said rings in a ring rolling mill to form outer and inner race rings respectively for said rolling bearing.

2. A method of making inner and outer race rings for a rolling bearing from a generally circular blank consisting of the steps of removing an inner central disc portion from the blank leaving an outer ring, impressing at least one face of the inner central disc portion with a centrally located conical impression, positioning the central disc portion over a conical guide member engaging in said central impression so that the opposite face may be engaged centrally with a pointed conical punch and thereafter piercing by means of the pointed conical punch one face and thereafter the other face of the disc portion to a depth to form an opening extending therethrough whereby the material of the disc is displaced outwardly, and finishing both said rings in a ring rolling mill to form outer and inner race rings respectively for said rolling bearing.

References Cited by the Examiner

UNITED STATES PATENTS

| | | | |
|---|---|---|---|
| 2,389,758 | 11/1945 | Bittermann | 29—148.4 |
| 2,913,811 | 11/1959 | Benson | 29—148.4 |
| 3,036,365 | 5/1962 | Hanau | 29—148.4 |
| 3,142,115 | 7/1964 | Schaming | 29—148.4 |

WHITMORE A. WILTZ, *Primary Examiner.*